United States Patent
Hathaway et al.

(10) Patent No.: US 12,184,945 B2
(45) Date of Patent: *Dec. 31, 2024

(54) SYSTEMS AND METHODS FOR RECORDING BROADCAST PROGRAMS THAT WILL BE MISSED DUE TO TRAVEL DELAYS

(71) Applicant: Adeia Guides, Inc., San Jose, CA (US)

(72) Inventors: Cara Lyn Hathaway, Tulsa, OK (US); Walter R. Klappert, North Hollywood, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,624

(22) Filed: Nov. 22, 2023

(65) Prior Publication Data
US 2024/0163525 A1  May 16, 2024

Related U.S. Application Data

(63) Continuation of application No. 17/591,450, filed on Feb. 2, 2022, now Pat. No. 11,863,840, which is a
(Continued)

(51) Int. Cl.
| | |
|---|---|
| *H04N 21/6543* | (2011.01) |
| *H04N 21/258* | (2011.01) |
| *H04N 21/262* | (2011.01) |
| *H04N 21/422* | (2011.01) |
| *H04N 21/433* | (2011.01) |

(Continued)

(52) U.S. Cl.
CPC ... *H04N 21/6543* (2013.01); *H04N 21/25891* (2013.01); *H04N 21/26283* (2013.01); *H04N 21/42202* (2013.01); *H04N 21/42203* (2013.01); *H04N 21/4334* (2013.01); *H04N 21/44218* (2013.01); *H04N 21/4524* (2013.01); *H04N 21/4532* (2013.01); *H04N 21/4583* (2013.01);
(Continued)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |

(Continued)

FOREIGN PATENT DOCUMENTS

EP          2369530 A1       9/2011

*Primary Examiner* — Ricky Chin
(74) *Attorney, Agent, or Firm* — Haley Guiliano LLP

(57) ABSTRACT

Systems and methods are described herein for alerting a user that the user will be unable to view a broadcast program based on an estimated time of arrival of the user to a media consumption device, and responsively providing the user with an option to record the broadcast program. These systems and methods are performed at least by identifying a plurality of broadcast programs that are indicated on a profile of a user, receiving an estimated time of arrival of the user to a location of a media consumption device, responsively determining whether the user will be unable to view a broadcast program of the plurality of broadcast programs, responsively providing the user with an option to record the broadcast program, and responsively causing the broadcast program to be recorded.

20 Claims, 5 Drawing Sheets

Related U.S. Application Data continuation of application No. 16/989,172, filed on Aug. 10, 2020, now Pat. No. 11,277,673, which is a continuation of application No. 15/042,829, filed on Feb. 12, 2016, now Pat. No. 10,779,055.

(51) Int. Cl.
*H04N 21/442* (2011.01)
*H04N 21/45* (2011.01)
*H04N 21/458* (2011.01)
*H04N 21/472* (2011.01)
*H04N 21/488* (2011.01)

(52) U.S. Cl.
CPC ... *H04N 21/47214* (2013.01); *H04N 21/4882* (2013.01)

(56) References Cited

U.S. PATENT DOCUMENTS

| | | | |
|---|---|---|---|
| 7,165,098 B1 | 1/2007 | Boyer et al. | |
| 7,684,991 B2* | 3/2010 | Stohr | G06F 16/64 704/270.1 |
| 7,761,892 B2 | 7/2010 | Ellis et al. | |
| 8,024,073 B2* | 9/2011 | Imes | G06Q 50/06 700/19 |
| 8,046,801 B2 | 10/2011 | Ellis et al. | |
| 8,396,604 B2* | 3/2013 | Imes | H02J 13/00 700/286 |
| 8,412,382 B2* | 4/2013 | Imes | H02J 13/00017 700/282 |
| 8,769,578 B2 | 7/2014 | Lau et al. | |
| 10,110,939 B1* | 10/2018 | Wittke | H04N 21/26283 |
| 10,779,055 B2* | 9/2020 | Hathaway | H04N 21/47214 |
| 11,159,853 B2* | 10/2021 | Hirabayashi | H04N 21/458 |
| 11,277,673 B2 | 3/2022 | Hathaway et al. | |
| 11,711,585 B2* | 7/2023 | Hirabayashi | H04N 21/458 725/33 |
| 2002/0072356 A1* | 6/2002 | Yamashita | H04M 1/72415 455/420 |
| 2002/0174430 A1 | 11/2002 | Ellis et al. | |
| 2003/0023489 A1* | 1/2003 | McGuire | G06Q 30/0257 705/14.66 |
| 2004/0107447 A1* | 6/2004 | Katagishi | H04N 21/84 725/135 |
| 2004/0117249 A1* | 6/2004 | Wang | G06Q 30/0224 705/14.27 |
| 2005/0251827 A1 | 11/2005 | Ellis et al. | |
| 2006/0007314 A1 | 1/2006 | Fong | |
| 2006/0136965 A1 | 6/2006 | Ellis et al. | |
| 2006/0174270 A1 | 8/2006 | Westberg et al. | |
| 2008/0250457 A1* | 10/2008 | Ohno | H04N 5/782 725/58 |
| 2009/0018763 A1* | 1/2009 | Koga | H04N 21/454 701/532 |
| 2009/0047022 A1* | 2/2009 | Newman | G08C 23/04 398/106 |
| 2009/0100478 A1* | 4/2009 | Craner | H04N 21/4753 725/87 |
| 2009/0142042 A1* | 6/2009 | Branam | H04N 21/4227 386/243 |
| 2009/0165049 A1* | 6/2009 | Sekiguchi | H04N 21/41265 725/39 |
| 2009/0234659 A1* | 9/2009 | Liao | G06Q 10/047 705/5 |
| 2010/0100310 A1* | 4/2010 | Eich | G08G 1/096861 701/533 |
| 2010/0153885 A1 | 6/2010 | Yates | |
| 2010/0222079 A1* | 9/2010 | Lee | G01C 21/343 704/235 |
| 2011/0054710 A1* | 3/2011 | Imes | H04L 67/141 700/286 |
| 2011/0083154 A1* | 4/2011 | Boersma | H04N 21/4334 725/116 |
| 2011/0154403 A1* | 6/2011 | Sinha | H04N 21/47 725/52 |
| 2011/0197221 A1* | 8/2011 | Rouse | G06Q 30/02 725/32 |
| 2011/0218711 A1* | 9/2011 | Mathur | G10L 15/22 701/532 |
| 2011/0231521 A1* | 9/2011 | Higgins | H04N 21/4333 709/219 |
| 2011/0257881 A1* | 10/2011 | Chen | G01C 21/362 701/465 |
| 2011/0282719 A1* | 11/2011 | Turner | G06Q 30/0207 705/14.1 |
| 2011/0286719 A1* | 11/2011 | Woods | H04N 21/4583 386/293 |
| 2012/0072107 A1* | 3/2012 | Okude | G01C 21/343 701/527 |
| 2012/0136572 A1* | 5/2012 | Norton | G01C 21/3407 701/465 |
| 2012/0245847 A1* | 9/2012 | Cheng | G06Q 10/10 701/527 |
| 2012/0310838 A1* | 12/2012 | Harris | G06Q 20/12 705/65 |
| 2013/0151143 A1* | 6/2013 | Lee | G01C 21/343 701/425 |
| 2013/0158846 A1* | 6/2013 | Zhang | G08G 1/127 701/117 |
| 2013/0304526 A1* | 11/2013 | Boyd | G06Q 10/02 705/5 |
| 2013/0343727 A1* | 12/2013 | Rav-Acha | H04N 9/87 386/282 |
| 2014/0164089 A1* | 6/2014 | Joa | G06Q 30/0226 705/14.27 |
| 2014/0207680 A1* | 7/2014 | Rephlo | G06Q 20/384 705/44 |
| 2014/0221033 A1* | 8/2014 | Xia | H04R 27/00 455/515 |
| 2014/0250399 A1* | 9/2014 | Gaherwar | G06Q 10/06 715/771 |
| 2014/0270714 A1* | 9/2014 | Osminer | H04N 21/47214 386/296 |
| 2014/0365107 A1* | 12/2014 | Dutta | G01C 21/343 701/538 |
| 2015/0215738 A1* | 7/2015 | Frusina | H04N 21/422 455/552.1 |
| 2015/0242877 A1* | 8/2015 | Bliss | H04N 21/84 705/14.66 |
| 2016/0003637 A1* | 1/2016 | Andersen | G01C 21/362 701/519 |
| 2016/0232558 A1* | 8/2016 | Postrel | G06Q 30/0625 |
| 2016/0349075 A1* | 12/2016 | Son | G01C 21/3469 |
| 2017/0111694 A1* | 4/2017 | Marsh | H04L 12/6418 |
| 2017/0124671 A1* | 5/2017 | Tam | G06Q 50/14 |
| 2017/0238064 A1* | 8/2017 | Hathaway | H04N 21/25891 725/34 |
| 2017/0309072 A1* | 10/2017 | Li | H04L 67/306 |
| 2017/0358022 A1* | 12/2017 | Deak | G06Q 30/0631 |
| 2018/0157745 A1* | 6/2018 | Williams | G06F 16/4387 |
| 2018/0176651 A1* | 6/2018 | Hirabayashi | H04N 21/47214 |
| 2018/0234707 A1* | 8/2018 | Pujia | H04N 21/4227 |
| 2018/0350403 A1* | 12/2018 | Bohn | H04N 21/44 |
| 2019/0072408 A1* | 3/2019 | Lee | G01C 21/3438 |
| 2019/0139089 A1* | 5/2019 | Sood | G06Q 10/067 |
| 2019/0213429 A1* | 7/2019 | Sicconi | G06F 3/012 |
| 2020/0027116 A1* | 1/2020 | Royyuru | G06Q 30/0233 |
| 2020/0042566 A1* | 2/2020 | Xin | H04N 21/25841 |
| 2020/0342040 A1* | 10/2020 | Adams | G06Q 20/12 |
| 2021/0067811 A1* | 3/2021 | Bates | H04N 21/41422 |
| 2022/0159348 A1* | 5/2022 | Hathaway | H04N 21/6543 |
| 2023/0336825 A1* | 10/2023 | Hirabayashi | H04N 21/41407 |

* cited by examiner

SYSTEMS AND METHODS FOR RECORDING BROADCAST PROGRAMS THAT WILL BE MISSED DUE TO TRAVEL DELAYS

CROSS-REFERENCE TO RELATED APPLICATIONS

This application is a continuation of U.S. patent application Ser. No. 17/591,450, filed Feb. 2, 2022, which is a continuation of U.S. patent Application Ser. No. 16/989,172, filed Aug. 10, 2020 (now U.S. Pat. No. 11,277,673), which is a continuation of U.S. patent application Ser. No. 15/042,829, filed Feb. 12, 2016 (now U.S. Pat. No. 10,779,055), which are hereby incorporated by reference herein in their entireties.

BACKGROUND

In an age where video on-demand services are ubiquitous, huge volumes of people nevertheless continue to subscribe to broadcast television services and consume television according to broadcast schedules. In some cases, a user may look forward to watching a broadcast program at its original broadcast time, such as a morning talk show, but the user may be unable to watch the broadcast program at that time. Moreover, unless the user has set up the broadcast program to be recorded in advance, the user may miss the opportunity to consume the broadcast program.

SUMMARY

In some aspects of the disclosure, a user may be unable to watch a broadcast program at a desired time because the user is not at a location with a device from which the user may view the program. To address this problem, the disclosure describes systems and methods for using information of a user's navigational application (e.g., a "maps" application on a smartphone device) to predict when a user will arrive at home. This information may be compared to broadcast schedules for the user's preferred programming to learn whether the user's predicted arrival time will cause the user to miss viewership opportunities. If a user's predicted arrival time will cause the user to miss viewership opportunities, the user may be alerted to this circumstance, and may be offered an option to record the program, so that he may consume the program upon arriving home.

Systems and methods are described herein for alerting a user that the user will be unable to view a broadcast program based on an estimated time of arrival of the user to a media consumption device, and responsively providing the user with an option to record the broadcast program.

To accomplish this object and other objects, control circuitry may execute a media guidance application that identifies a plurality of broadcast programs that are indicated on a profile of a user. For example, the media guidance application may access a profile to learn of broadcast programs that the user commonly views, or is likely to enjoy.

In some embodiments, the media guidance application may receive an estimated time of arrival of the user to a location of a media consumption device. As an example, the media guidance application may receive or retrieve data from a navigational application that indicates an estimated time of arrival for a user to arrive to the user's destination. The estimated time of arrival may be calculated based on any factors, such as mode of transportation, traffic, obstacles, planned stops, and any other factors.

In some embodiments, the media guidance application may receive the estimated time of arrival from a first application that predicts the estimated time of arrival based on navigation information. In one example, the first application may run on user equipment, such as the user's smart phone. In another example, the first application may run on a dedicated device, such as a stand-alone GPS device. In some embodiments, the media guidance application may cause the estimated time of arrival to be received by a second application. The second application may be the media guidance application itself, or a different application (e.g., an application that sends alerts or reminders to the user).

In some embodiments, in response to receiving the estimated time of arrival, the media guidance application may determine whether the user will be unable to view a broadcast program of the plurality of broadcast programs. For example, the media guidance application may determine, based on estimated time of arrival information, that the user will arrive home too late to watch a broadcast program he or she was hoping to watch because it airs before he arrives home.

In some embodiments, when the media guidance application is determining whether the user will be unable to view a broadcast program of the plurality of broadcast programs, the media guidance application may compare the estimated time of arrival to a scheduled broadcast time of each broadcast program of the plurality of broadcast programs. For example, the media guidance application may receive or retrieve a broadcast schedule from a remote or local source (e.g., a local memory or a cable headend). The media guidance application may then determine, based on the comparing, whether the scheduled broadcast time of the broadcast program is later than the estimated time of arrival.

In some embodiments, in response to determining that the user will be unable to view the broadcast program, the media guidance application may provide the user with an option to record the broadcast program. For example, the media guidance application may generate for display a prompt, or may cause a prompt to be output by speakers of a user's smart phone, asking the user whether the user would like to record the broadcast program. In another example, the media guidance application may cause the second application (e.g., a reminder application) to prompt the user. In response to receiving a user selection of the option, the media guidance application may cause the broadcast program to be recorded (e.g., by issuing a command to a digital video recorder (DVR)).

In some embodiments, when the media guidance application determines that the user will be unable to view the broadcast program, and a user responsively sets up a recording, circumstances may change. For example, the media guidance application may receive a revised estimated time of arrival, and the media guidance application may determine, based on the revised estimated time of arrival, that the user will be able to view the broadcast program. In response to determining that the user will be able to view the broadcast program, the media guidance application may cause the broadcast program to no longer be recorded. Effectively, if the estimated time of arrival is revised to be shorter, the media guidance application may learn that the user will actually arrive at home in time to view a program that was scheduled to be recorded, and may cause the program to not be recorded automatically. Alternatively, the media guidance application may prompt the user with an option to cancel the scheduled recording.

In some embodiments, the media guidance application may, when providing the user with an option to record the broadcast program, determine whether the user is available to pay attention to the option, and based on the determining of whether the user is available to pay attention to the option, the media guidance application may refrain from providing the user with the option until it is determined that the user is available to pay attention to the option. The media guidance application may determine whether the user is available to pay attention to the option based on any known metric, such as detecting whether the user is in heavy traffic and therefore busy (e.g., based on information from a navigational application), whether the user is in a conversation and therefore distracted (e.g., based on input from a microphone), and the like.

In some embodiments, when the media guidance application is determining whether the user is available to pay attention to the option, the media guidance application may receive information from an application that tracks driving patterns of the user, such as a GPS application. The media guidance application may then determine, based on the information, whether the user is available to pay attention to the option based on whether the information indicates that the user is presently focused on driving.

In some embodiments, when the media guidance application is providing the user with the option to record the broadcast program, the media guidance application may cause a GPS application to receive a command to generate for display the option, and in response to receiving the command, either the media guidance application or the GPS application may generate for display, on top of GPS information generated for display by the GPS application, an overlay that prompts the user with the option. Thus, the GPS application itself may be used to warn the user that a show is to be missed, and to relay the prompt, to the user. If the user wishes to record the program, the user may respond to the prompt, and the media guidance application may learn of the response by receiving the response from the GPS application.

In some embodiments, the estimated time of arrival is computed by a GPS application that is executed by user equipment, and, when the media guidance application provides the user with the option to record the broadcast program, the media guidance application causes the GPS application to notify the user that, based on the estimated time of arrival, the broadcast program will be missed by the user by way of a voice command (e.g., by vocalizing through the GPS application to the user that the program will be missed). The media guidance application may receive, through the GPS application, a voice command from the user to select the option. For example, if the user exclaims that the user does want to record the program, the GPS application may detect this exclamation, and the media guidance application may receive the exclamation from the GPS application.

In some embodiments, when the media guidance application provides the user with the option to record the broadcast program, the media guidance application may determine a plurality of locations at which the user is able to record the broadcast program, and May prompt the user to select a location at which to record the broadcast program. For example, if the media guidance application detects that the user may record at the user's home, or on a remote server that is in the cloud and run by a broadcast television provider, the media guidance application may prompt the user to select one of the two locations to record.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
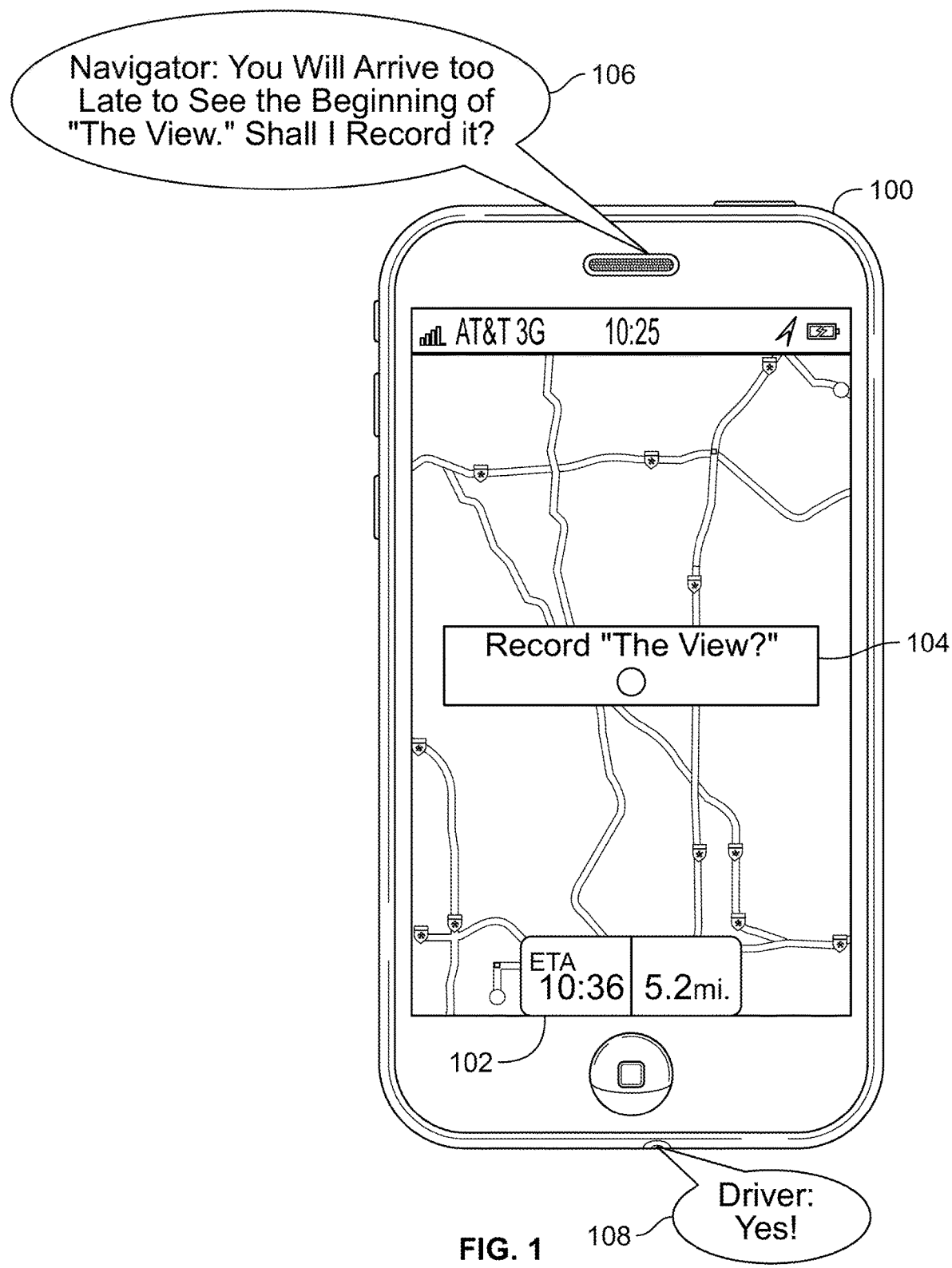
FIG. 1 depicts a user equipment that is displaying a graphical user interface for a navigational application, and that prompts a user to record a broadcast program that the user may miss, in accordance with some embodiments of the disclosure.

FIG. 1 depicts a user equipment that is displaying a graphical user interface for a navigational application, and that prompts a user to record a broadcast program that the user may miss, in accordance with some embodiments of the disclosure. FIG. 1 depicts user equipment 100. While user equipment 100 is depicted as a smart phone device, this is merely for convenience, and user equipment 100 may have the capabilities of any of user television equipment 502, user computer equipment 504, and wireless user communications device 506. User equipment 100 may implement a navigational application, as depicted in FIG. 1. The navigational application may calculate an estimated time of arrival 102, as is displayed on user equipment 100. The estimated time of arrival 102 may be based on any factors, such as a user's mode of transportation (e.g., walk, bike, car, train, etc.), a user's destination, traffic factors, and any other factor that may assist in calculating an estimated time of arrival. The term "estimated time of arrival" is used interchangeably with "ETA" in this disclosure, and both carry the same meaning. The term "navigational application" is used interchangeably herein with "GPS application" and "'maps' application," and these terms each carry the same weight and meaning.

FIG. 1 depicts prompts 104 and 106. A media guidance application executed by control circuitry 404 of user equipment 100 may generate for display prompt 104 (e.g., by way of a display). Alternatively, or additionally, the media guidance application may cause the content of a prompt (e.g., prompt 106) to be output verbally, such as through speakers. Prompt 104 may comprise a selectable option (e.g., that is selectable by way of user input interface). A response to prompt 106 (e.g., response 108) may be received verbally by way of a user input interface such as a microphone. The contents and purposes of prompts 104 and 106 will be described in further detail below. Functionality of the display, speakers, user input interface, media guidance application, and other features of user equipment 100 will be described with respect to FIGS. 2-5 below.

In some aspects of the disclosure, a user may be unable to watch a broadcast program at a desired time because the user is not at a location with a device from which the user may view the program. To address this problem, the disclosure describes systems and methods for using information of a user's navigational application (e.g., a "maps" application on a smartphone device, as displayed on user equipment 100) to predict when a user will arrive at home. For example, ETA 102 may be calculated by a navigational application and used to arrive at this prediction. ETA 102 may be compared to broadcast schedules for the user's preferred programming to learn whether the user's predicted arrival time will cause the user to miss viewership opportunities. For example, the media guidance application of user equipment 100 may retrieve ETA 102 from the navigational application, and compare ETA 102 to a broadcast start time for a program the user usually watches, to learn whether the user is subject to missing the start time of that broadcast program. If the media guidance application determines that the user's ETA 102 will cause the user to miss viewership opportunities, the user may be alerted to this circumstance (e.g., by prompt 104 or 106), and may be offered an option to record the program, so that he may consume the program upon arriving home.

In some embodiments of the disclosure, the media guidance application, executed by control circuitry 404, may identify a plurality of broadcast programs that are indicated on a profile of a user. For example, the media guidance application may access a profile to learn of broadcast programs that the user commonly views, or is likely to enjoy. The profile may be stored locally to user equipment 100 (e.g., on local storage), or remote to user equipment 100 (e.g., on a media guidance data source, accessible by way of a communications network). Functionality of local storage, a media guidance data source, a communications network, and other memory and communications functionality of the systems described herein are further described below with respect to FIGS. 2-5.

In some embodiments, the media guidance application may receive or retrieve an estimated time of arrival of the user to a location of a media consumption device. As an example, the media guidance application may receive or retrieve data from a navigational application that indicates estimated time of arrival 102 for a user to arrive to the user's destination. As described above, ETA 102 may be calculated based on any number of factors, and may be shared with media guidance application by a separate application (i.e., the navigational application), or, alternatively, may be calculated by the media guidance application itself, which may calculate the ETA based on any or all of the factors described above.

In some embodiments, the media guidance application may receive estimated time of arrival 102 from a first application that predicts the estimated time of arrival based on navigation information. In one example, the first application may run on user equipment, such as the user's smart phone. In another example, the first application may run on a dedicated device, such as a stand-alone GPS device. If the first application runs on a dedicated device, the media guidance application on user equipment 100 may retrieve ETA 102 from the first application by querying the dedicated device for ETA 102, and may receive a reply from the dedicated device including ETA 102. In some embodiments, the media guidance application may cause the estimated time of arrival to be received by a second application. The second application may be the media guidance application itself (e.g., the media guidance application may itself calculate ETA 102), or a through a different application running on user equipment 100 (e.g., an application that sends alerts or reminders to the user).

In some embodiments, in response to receiving the estimated time of arrival, the media guidance application may determine whether the user will be unable to view a broadcast program of the plurality of broadcast programs. For example, the media guidance application may determine, based on estimated time of arrival 102, that the user will arrive home too late to watch a broadcast program he or she was hoping to watch because it airs before he arrives home. For example, the media guidance application may compare ETA 102 to broadcast start times of the broadcast programs that the viewer normally views. To perform this comparison, the media guidance application may learn the broadcast programs that the viewer normally views based on information in the user's profile. The media guidance application may compare this information to that of a local storage, or a media guidance data source (as will be discussed below with respect to FIG. 5), to learn broadcast start times of each broadcast program that the viewer normally views. The media guidance application may determine, based on this comparison, that the broadcast start time precedes ETA 102. For example, if ETA 102 says the user will arrive home at 10:36 am, but the user normally views broadcast program "The View" at 10:30 am, the media guidance application may determine that the viewer will miss the beginning of "The View."

In some embodiments, in response to determining that the user will be unable to view the broadcast program, the media guidance application may provide the user with an option to record the broadcast program (e.g., through prompts 104 and 106). For example, the media guidance application may generate for display prompt 104 in any manner described above or below. Prompt 104 may comprise a query to the user as to whether to record a program that may be missed. For example, if the user will not make it home in time to watch the beginning of the broadcast program "The View," prompt 104 may offer to the user to record "The View." Prompt 104 may comprise a selectable option for recording the view (as illustrated by the dot in prompt 104 in FIG. 1). If a user selects the selectable option, the media guidance application may cause "The View" to be recorded. In other embodiments, the media guidance application may alternatively, or additionally, prompt the user verbally (e.g., through prompt 106, which may output a voice prompt that states "You will arrive too late to see the beginning of 'The View.' Shall I record it?" If a user speaks a reply of "Yes," as indicated in command 108, the media guidance application may cause a recording of "The View" to occur. The user may also reply to prompt 104 with a verbal command 108.

In some embodiments, when the media guidance application commands a recording (e.g., a recording of "The View" to occur) in response to prompt 104 and/or prompt 106, the media guidance application may determine where to transmit the command. For example, the user may only have one digital video recorder ("DVR") device, and thus the media guidance application may transmit the command to the DVR device. In other embodiments, the user may not have a DVR device, but may subscribe to a remote recorder service, where a remote server records the program, and thus, the media guidance application may transmit the command to the remote recorder service. In some embodiments, the user may have multiple options as to where to record the program. In these instances, the remote recorder service may automatically determine where to record the device, such as using methods and systems described in commonly owned U.S. Pat. No. 8,769,578, granted on Jul. 1, 2014, the contents of which are hereby incorporated by reference herein in their entirety. Alternatively, the media guidance application may generate for display a prompt, or generate an audio prompt, that indicates potential recording locations, and asks the user to select a recording location. In response to receiving the selection, the media guidance application may cause the selected location to have a recording device record the broadcast program.

In some embodiments, when the media guidance application determines that the user will be unable to view the broadcast program, and a user responsively sets up a recording, circumstances may change. For example, the media guidance application may receive a revised estimated time of arrival 102, and the media guidance application may determine, based on the revised estimated time of arrival 102, that the user will be able to view the broadcast program. For example, updated traffic conditions where traffic has lessened may cause ETA 102 to revert to an earlier time. As another example, if a user's ETA 102 was calculated under the basis that the user will be walking to his destination, but the user has now indicated he will be driving to his destination, ETA 102 may revert to an earlier time.

If ETA 102 is updated to an earlier time, the media guidance application may compare the earlier time to the broadcast start times in the same manner described above, and, based on this comparison, the media guidance application may determine that the user will in fact be able to view the broadcast program. For example, the media guidance application may determine that the user's ETA is now 10:29 am, and thus that the user will be able to watch "The View" at 10:30 am. In response to determining that the user will be able to view the broadcast program, the media guidance application may cause the broadcast program to no longer be recorded. Effectively, if the estimated time of arrival is revised to be shorter, the media guidance application may learn that the user will actually arrive at home in time to view a program that was scheduled to be recorded, and may cause the program to not be recorded automatically. Alternatively, the media guidance application may prompt the user with an option to cancel the scheduled recording. For example, prompt 104 or prompt 106 may be prompted to the user to query the user as to whether the user wants to cancel a recording of "The View." If the user selects an option, or speaks a command, to not record "The View," the previously-scheduled recording may be canceled.

In some embodiments, the media guidance application may, when providing the user with prompt 104 or prompt 106, determine whether the user is available to pay attention to the option, and based on the determining of whether the user is available to pay attention to the option, the media guidance application may refrain from providing the user with the option until it is determined that the user is available to pay attention to the option. The media guidance application may determine whether the user is available to pay attention to prompt 104 or 106 based on any known metric, such as detecting whether the user is in heavy traffic and therefore busy (e.g., based on information from a navigational application), whether the user is in a conversation and therefore distracted (e.g., based on input from a user input interface, such as a microphone), and the like. As an example, the media guidance application may determine that a user is in motion based on feedback from an accelerometer, and thus that the user is distracted, and this determination may cause the media guidance application to wait to output prompt 104 or prompt 106 until the media guidance application detects that the user is no longer in motion. As another example, the media guidance application may determine that the user is speaking (e.g., through input through a microphone of user equipment 100), and may thus wait until the user is no longer speaking to output prompt 104 or 106.

In some embodiments, when the media guidance application is determining whether the user is available to pay attention to the option, the media guidance application may receive information from an application that tracks driving patterns of the user, such as a GPS application. The information may be similar to that described as received by the media guidance application above. For example, the media guidance application may receive information from a navigational application that indicates that the user is in stop-and-go traffic, and thus is at risk of an accident if a distraction occurs. Thus, the media guidance application may then determine, based on the information, that the information indicates that the user is presently focused on driving. This may cause the media guidance application to determine to refrain from outputting prompt 104 or prompt 106 to the user until a later time.

In some embodiments, when the media guidance application is providing the user with prompt 104 or prompt 106, the media guidance application may cause a navigational application to receive a command to generate for display the option. In other words, the media guidance application may not itself output prompt 104 or prompt 106, and may instead cause a different application to output prompt 104 or prompt 106. For example, the media guidance application may command a navigational application to output prompt 104. This would cause the look and feel of prompt 104 to mimic the navigational application's own prompts. Similarly, the media guidance application may command a navigational application to output prompt 106. This would cause a voice style that is speaking prompt 106 to mimic that of the voice normally used by the navigational application. Thus, the GPS application itself may be used to warn the user that a show is to be missed, and to relay the prompt, to the user. If the user wishes to record the program, the user may respond to prompt 104 or 106 in any manner described above and below, and the media guidance application may learn of the response by receiving the response from the GPS application.

In connection with the foregoing, in some embodiments, the estimated time of arrival is computed by a GPS application that is executed by user equipment, and, when the media guidance application provides the user with the option to record the broadcast program, the media guidance causes the GPS application to notify the user that, based on the estimated time of arrival, the broadcast program will be missed by the user by way of a voice command (e.g., by vocalizing through the GPS application to the user that the program will be missed. The media guidance application may receive, through the GPS application, a voice command (e.g., command 108) from the user to select the option. For example, the user may exclaim the word "Yes" when asked by the media guidance application or when asked by a navigational application whether he wants to record "The View," and this may cause "The View" to be recorded. As another example, if the user exclaims in command 108 that the user does want to record the program, the GPS application may detect this exclamation, and the media guidance application may receive the exclamation from the GPS application.

In some embodiments, when the media guidance application provides the user with prompt 104 or prompt 106, the media guidance application may determine a plurality of locations at which the user is able to record the broadcast program. For example, the media guidance application may access a user profile (e.g., from local storage, or from a remote database such as a media guidance data source) to determine which locations the user is able to record to. The media guidance application may then prompt the user (e.g., in a manner similar to the mechanisms described with respect to prompts 104 and 106) to select a location at which to record the broadcast program. For example, if the media guidance application detects that the user may record at the user's home, or on a remote server that is in the cloud and run by a broadcast television provider, the media guidance application may prompt the user to select one of the two locations to record.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
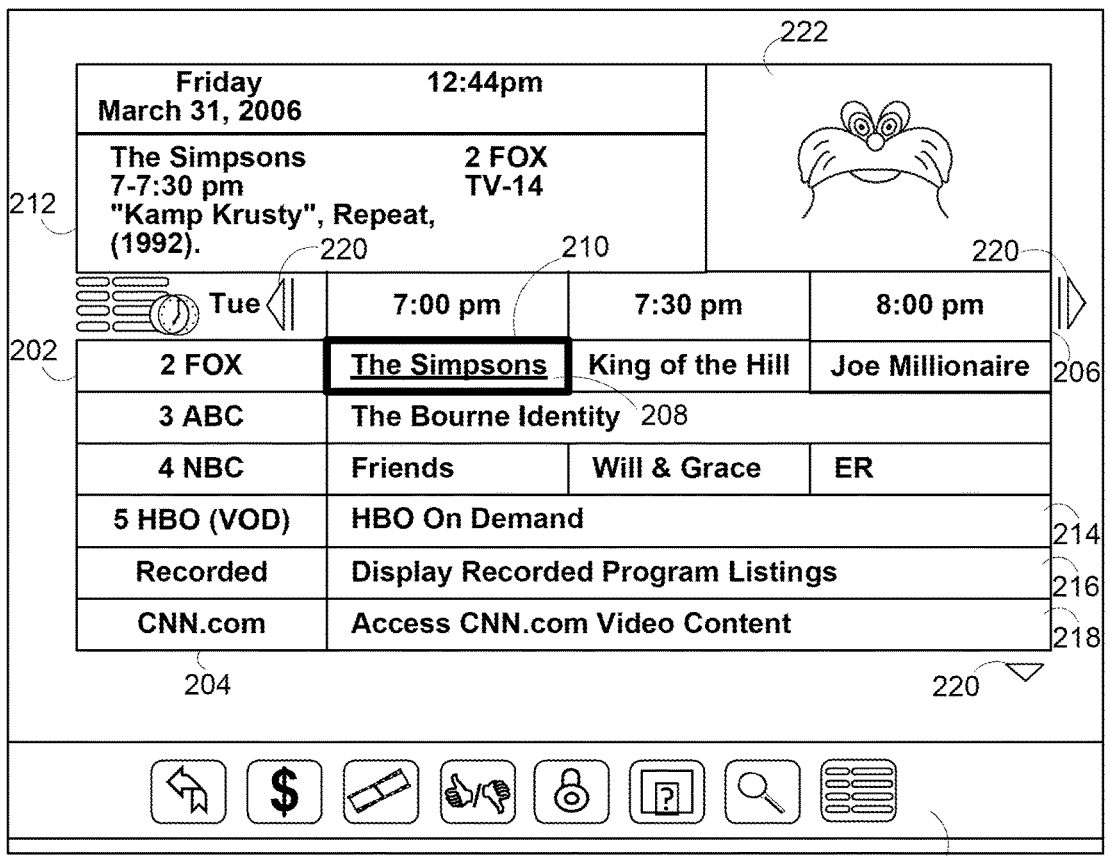
FIG. 2 shows an illustrative embodiment of a display screen that may be used to provide media guidance application listings and other media guidance information, in accordance with some embodiments of the disclosure.
Figure 3:
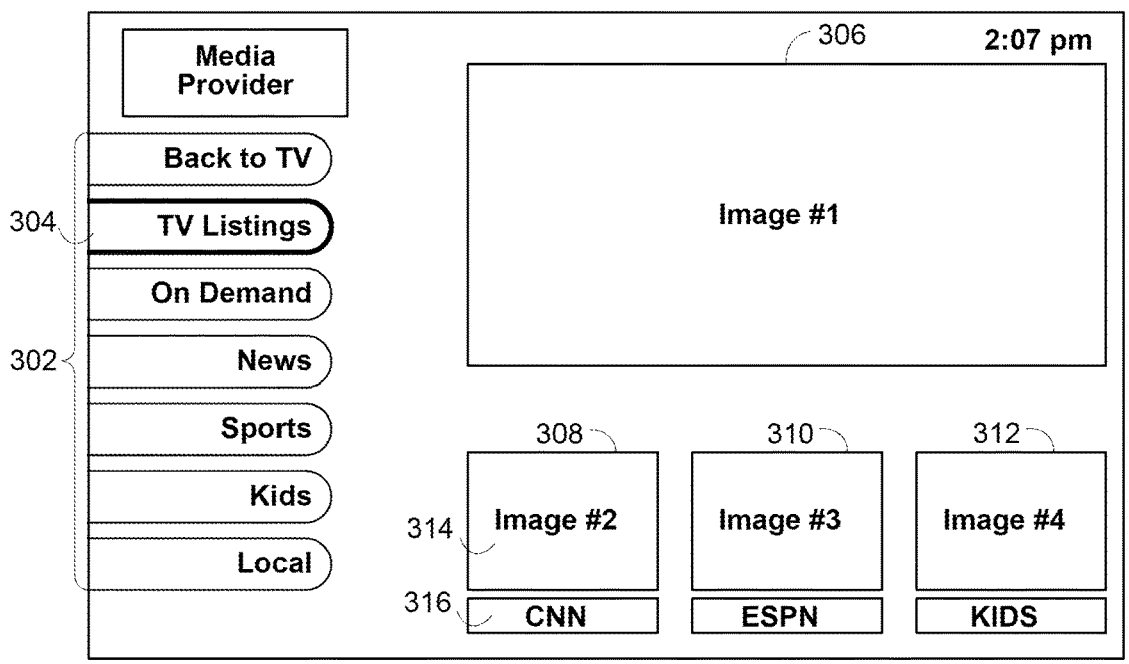
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
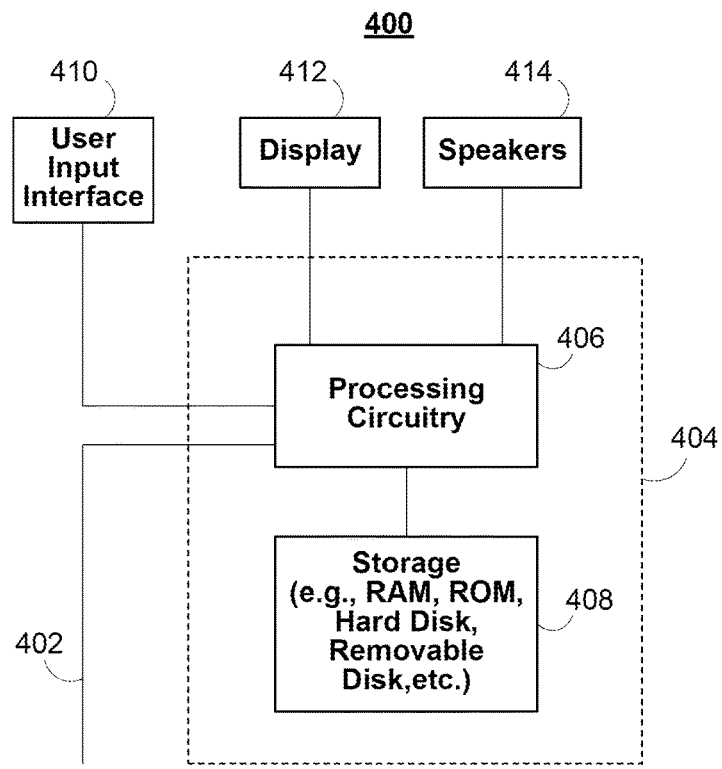
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
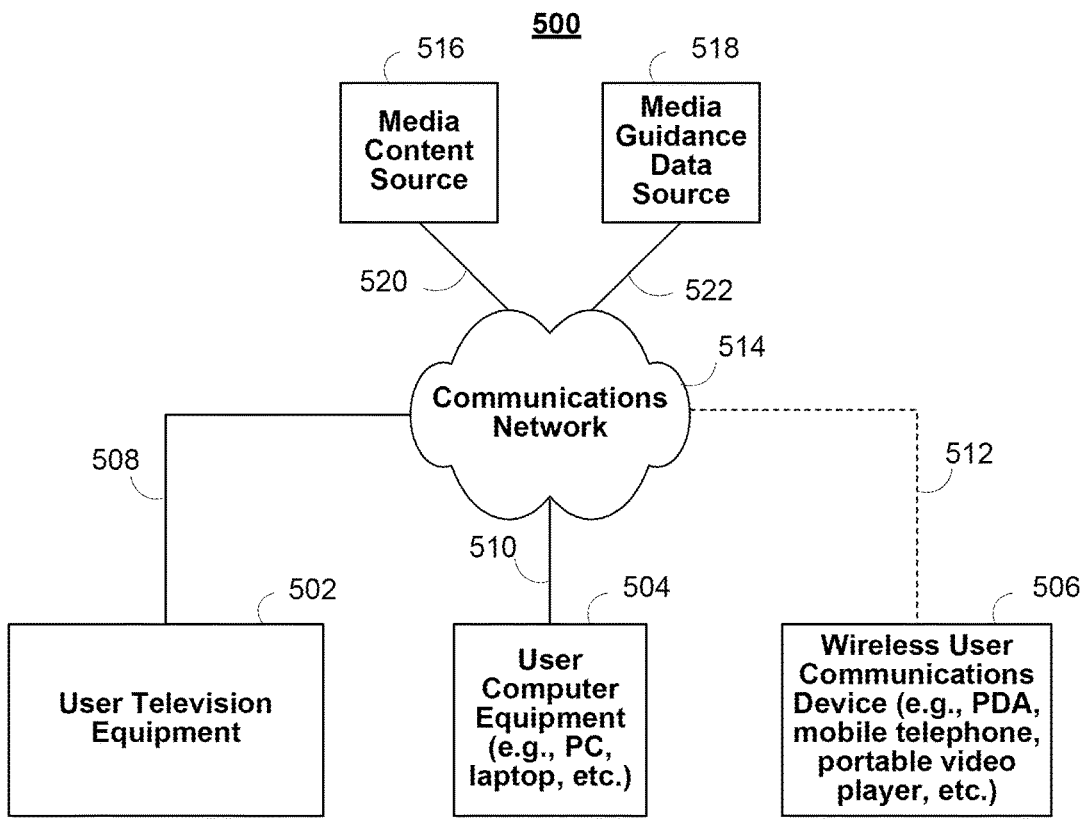
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
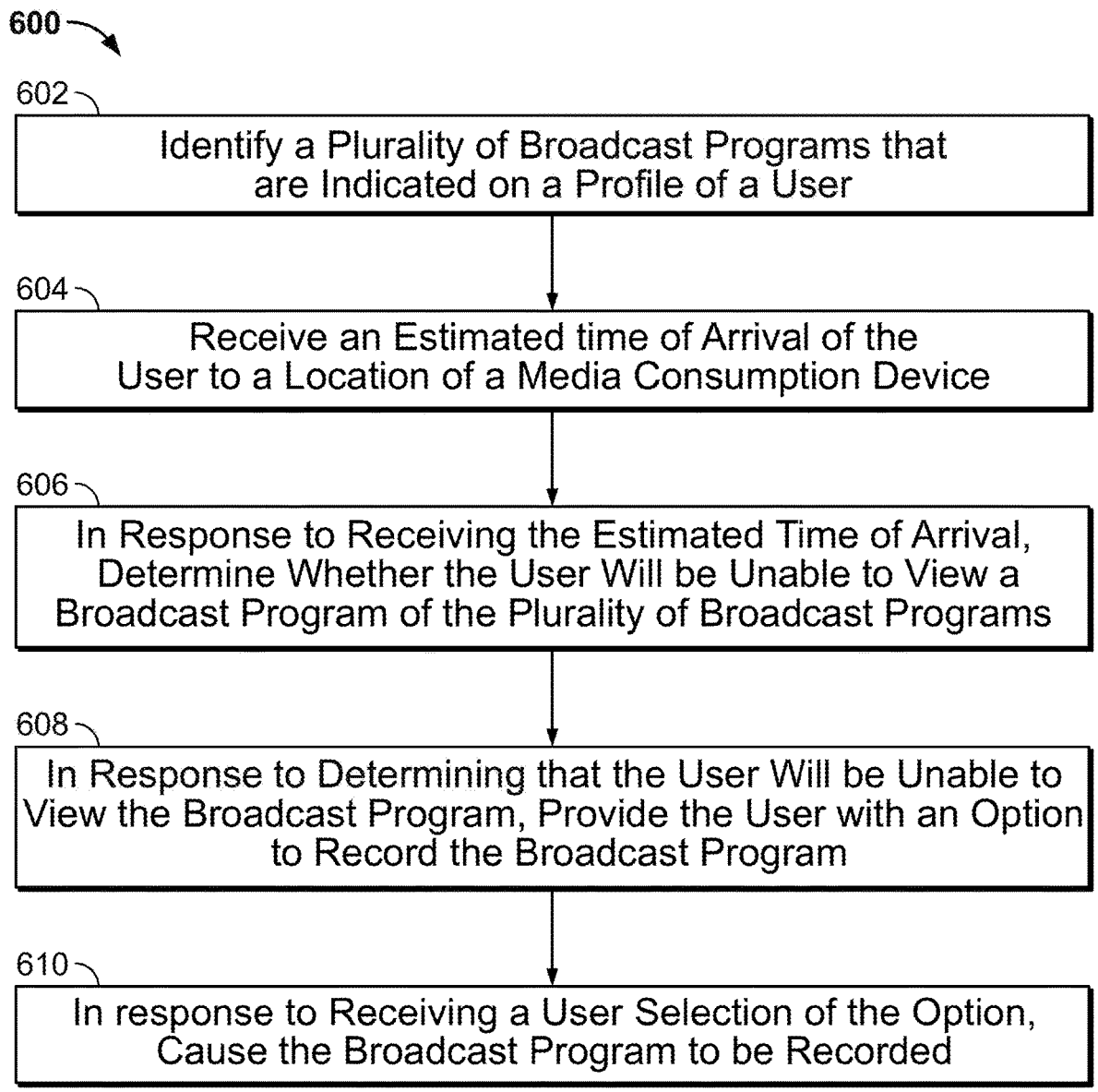
FIG. 6 is a flowchart of illustrative steps involved in utilizing an estimated time of arrival to determine whether to prompt a user to record a show that is likely to be missed, in accordance with some embodiments of the disclosure.

FIG. 6 is a flowchart of illustrative steps involved in utilizing an estimated time of arrival to determine whether to prompt a user to record a show that is likely to be missed, in accordance with some embodiments of the disclosure. Process 600 starts at 602, where a media guidance application executed by control circuitry 404 of user equipment 100 may identify a plurality of broadcast programs that are indicated on a profile of a user. As an example, the media guidance application may retrieve the profile from storage 408 that is local to user equipment 100. As anther example, the media guidance application may retrieve the profile from media guidance data source 518 (e.g., by way of communications network 514). The profile may include various metadata associated with the user, such as the user's preferences. The preferences may indicate broadcast programs that the user tends to watch, has rated highly, that the user tends to record, and any other preference about broadcast programs associated with the user.

Process 600 may continue to 604, where the media guidance application may receive an estimated time of arrival of the user to a location of a media consumption device. The estimated time of arrival may be received and calculated based on any manner described above and below with respect to estimated time of arrival 102. The location of the media consumption device may be a user's home where a user's television set is housed. As described above and below, the media guidance application may receive ETA 102 from a navigational application, or the media guidance application may calculate ETA 102 itself.

Process 600 may continue to 606, where the media guidance application may, in response to receiving the estimated time of arrival, determine whether the user will be unable to view a broadcast program of the plurality of broadcast programs. For example, if ETA 102 is 10:36 am, the media guidance application may compare a broadcast start time of each program of the plurality of programs reflected on the user profile to see if the broadcast start time precedes 10:36 am. In order to perform this comparison, the media guidance application may first retrieve broadcast times and dates of each program of the plurality of programs from media guidance data source 418 (e.g., by way of communications network 414), or from storage 308. The media guidance application may then filter these broadcast times and dates for broadcast programs that are being broadcast on the present date.

Then, the media guidance application may filter the broadcast times of the remaining programs for those that precede ETA 102 (e.g., 10:36 am), but are also reasonably close to ETA 102 (e.g., broadcast time is within two hours of ETA 102). The broadcast times that remain after this filtering process may be compared to ETA 102, and if they precede ETA 102, the media guidance application will determine that the user will be unable to view these broadcast programs. For example, if ETA 102 is 10:36 am, and "The View" is a preferred program of the user and its broadcast time is 10:00 am, the media guidance application will determine that the user will be unable to view "The View."

Process 600 may continue to 608, where, in response to determining that the user will be unable to view the broadcast program, the media guidance application may provide the user with an option to record the program. For example, the media guidance application may output prompt 104 or prompt 106 in any manner described above and below to provide the user with an option to record the program. Prompt 104 may be output by way of display 412. Prompt 106 may be output by way of speaker 414.

Process 600 may continue to 610, where, in response to receiving a selection of the option, the media guidance application may cause the broadcast program to be recorded. For example, the user may issue verbal command 108 to cause the broadcast program to be recorded, or the user may issue a command by selecting a selectable option within prompt 104 to cause the program to be recorded, as is described above and below. The user's commands may be received by user equipment 100 by way of user input interface 410.

Figure 7:
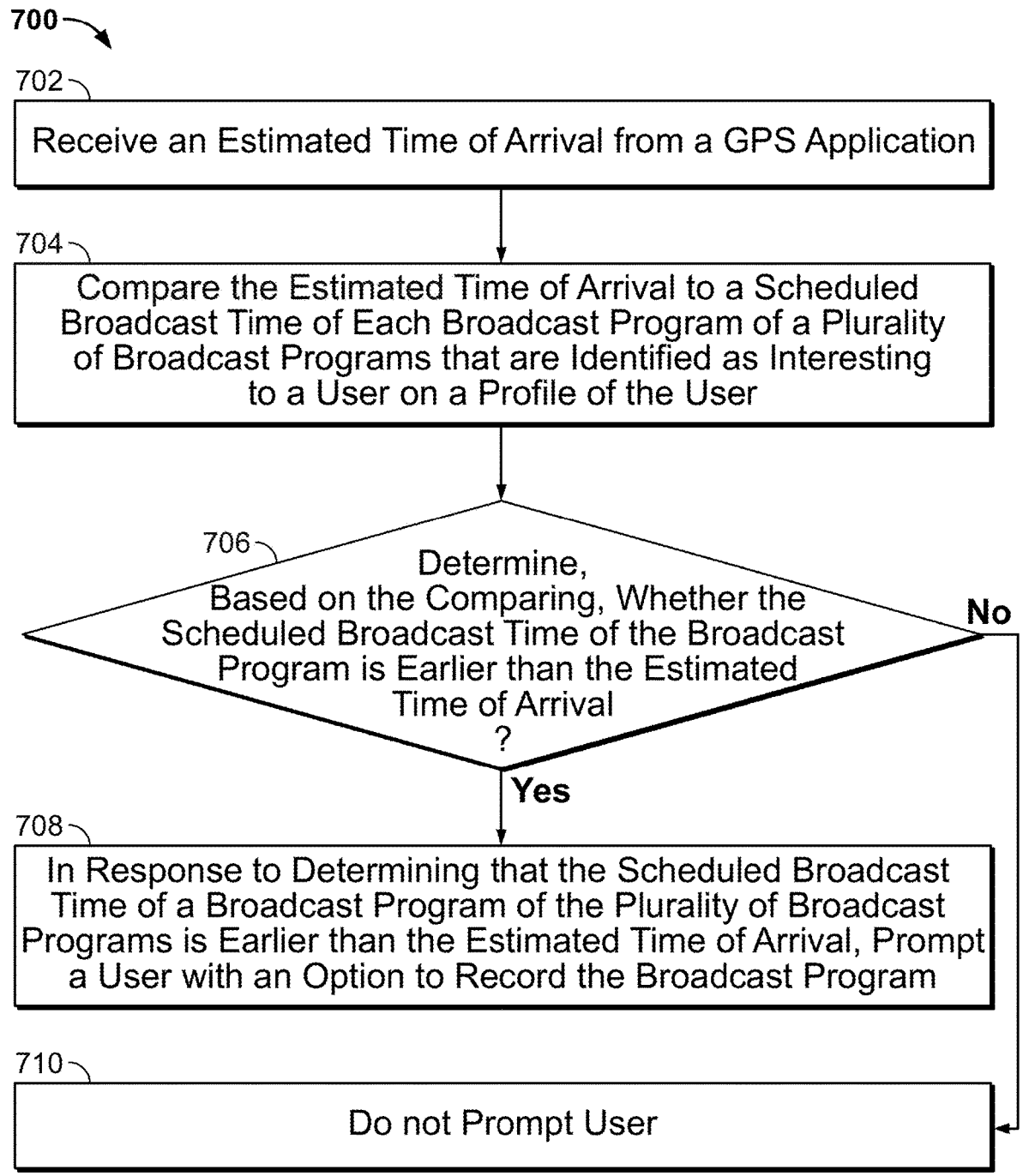
FIG. 7 is a flowchart of illustrative steps involved in determining whether a user will miss a program based on estimated time of arrival, in accordance with some embodiments of the disclosure.

FIG. 7 is a flowchart of illustrative steps involved in determining whether a user will miss a program based on estimated time of arrival, in accordance with some embodiments of the disclosure. Process 700 begins at 702, where the media guidance application may receive an estimated time of arrival (e.g., ETA 102) from a GPS application, such as the navigational application described above and below. ETA 102 may be received by the media guidance application using any manner described above and below.

Process 700 may continue to 704, where the media guidance application may compare the estimated time of arrival to a scheduled broadcast time of each broadcast programs of a plurality of broadcast programs that are identified as interesting to a user on a profile of the user. As an example, the media guidance application may retrieve a filtered list of broadcast programs that are near ETA 102 (as was described in detail above), and may compare the broadcast time of each program of the filtered list to ETA 102.

Process 700 may continue to 706, where the media guidance application may determine, based on the comparing, whether the scheduled broadcast time of a given broadcast program is earlier than an the estimated time of arrival. For example, if ETA 102 is 10:36 am, and a program called "The View" is a preferred program of the user and it begins to air at 10:30 am, the media guidance application may determine that the scheduled broadcast time of "The View" is earlier than ETA 102, and thus process 700 will proceed to 708. If, however, ETA 102 is 10:29 am, then the result of the determination of 706 will be that the scheduled broadcast time of the program is not earlier than ETA 102, and thus the user will make it home in time. In this case, process 700 will continue to 710, where the media guidance application does not prompt the user (e.g., with prompt 104 or prompt 106).

At 708, in response to determining that the scheduled broadcast time of the broadcast program is earlier than ETA 102, the media guidance application may prompt the user with an option to record the broadcast program. For example, the media guidance application may output or cause to be output one or both of prompts 104 and 106.

It should be noted that processes 600-700 or any step thereof could be performed on, or provided by, any of the devices shown in FIGS. 1 and 4-5. For example, any of processes 600-700 may be executed by control circuitry 404 (FIG. 4) as instructed by control circuitry implemented on user equipment 502, 504, and/or 506 (FIG. 5) in order to ensure media borrowed by a user is returned to its rightful owner. In addition, one or more steps of processes 600-700 may be incorporated into or combined with one or more steps of any other process or embodiment.

It is contemplated that the steps or descriptions of each of FIGS. 6-7 may be used with any other embodiment of this disclosure. In addition, the steps and descriptions described in relation to FIGS. 6-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, determining whether an estimated time of arrival precedes a broadcast time of a preferred program may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a user profile, as described herein, may be stored in, and retrieved from, storage 408 of FIG. 4, or media guidance data source 518 of FIG. 5. Furthermore, processing circuitry, or a computer program, may update settings associated with a user, such as a register of media assets stored on a user's user equipment, updating the information stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   identifying a content item that a user is likely to consume based on a consumption history of the user via a media consumption device;
   determining that the user's current location is remote from the media consumption device and based on the user's current location, the user will not reach a location where the media consumption device is located in time to consume the content item at its regularly broadcasted time;
   detecting, via a microphone, an audio input of the user's voice while the user is at the current location;
   delaying audible output of a recording prompt until the audio input of the user's voice is stopped; and
   in response to detecting that the audio input of the user's voice has stopped:
      causing, using a speaker, an audible output of the recording prompt, wherein the recording prompt provides an option to record the content item on a recording device associated with the media consumption device.

2. The method of claim 1, wherein, determining that user will not reach the location where the media consumption device is located in time to consume the content item at its regularly broadcasted time comprises:
   accessing a navigation application associated with an automobile used by the user;
   determining the user's current location based on a current location on the navigation application;
   determining the user's estimated time of arrival, based the determined current location on the navigation application;
   comparing the estimated time of arrival with a start time of the content item at its regularly broadcasted time; and
   based on the comparison, determining that the user will not reach the location where the media consumption device is located in time to consume the content item at its regularly broadcasted time.

3. The method of claim 1, further comprising:
   receiving a selection of the option to record the content item, wherein the selection is received in response to the audible output of the recording prompt; and
   in response to receiving the selection, using a recording device to record the content item.

4. The method of claim 1, wherein the estimated time of arrival is computed by a GPS application that is executed by user equipment.

5. The method of claim 1, wherein the recording prompt is outputted via a speaker of the navigation system.

6. The method of claim 5, wherein the recording prompt is configured to mimic a voice of the navigation system.

7. The method of claim 1, further comprising, configuring the recording prompt to inform the user that the user will be delayed in reaching the location where the media consumption device is located in time to consume the content item at its regularly broadcasted time.

8. The method of claim 1, wherein the audio input is associated with the user being involved in a conversation.

9. The method of claim 1, further comprising:
   determining, based on the user's current location, the user will not reach the location where the media consumption device is located in time to consume a second content item at its regularly broadcasted time;
   determining whether the user is distracted due to traffic while the user is in their current location; and
   in response to determining that the user is distracted due to traffic while the user is in their current location:
      delaying audible output of a second recording prompt until the user is not distracted due to traffic.

10. The method of claim 9, wherein the determination that the user is distracted due to traffic is based on information obtained from a navigation application.

11. A system comprising:
communications circuitry configured to access a recording device; and
control circuitry configured to:
identify a content item that a user is likely to consume based on a consumption history of the user via a media consumption device;
determine that the user's current location is remote from the media consumption device and based on the user's current location, the user will not reach a location where the media consumption device is located in time to consume the content item at its regularly broadcasted time;
detect, via a microphone, an audio input of the user's voice while the user is at the current location;
delaying audible output of a recording prompt until the audio input of the user's voice is stopped; and
in response to detecting that the audio input of the user's voice is stopped:
cause, using a speaker, an audible output of the recording prompt, wherein the recording prompt provides an option to record the content item on a recording device associated with the media consumption device.

12. The system of claim 11, wherein, determining that user will not reach the location where the media consumption device is located in time to consume the content item at its regularly broadcasted time comprises, the control circuitry configured to:
access a navigation application associated with an automobile used by the user;
determine the user's current location based on a current location on the navigation application;
determine the user's estimated time of arrival, based the determined current location on the navigation application;
compare the estimated time of arrival with a start time of the content item at its regularly broadcasted time; and
based on the comparison, determine that the user will not reach the location where the media consumption device is located in time to consume the content item at its regularly broadcasted time.

13. The system of claim 11, further comprising, the control circuitry configured to:
receive a selection of the option to record the content item, wherein the selection is received in response to the audible output of the recording prompt; and
in response to receiving the selection, use a recording device to record the content item.

14. The system of claim 11, wherein the estimated time of arrival is computed by a GPS application that is executed by user equipment.

15. The system of claim 11, wherein the recording prompt is outputted by the control circuitry via a speaker of the navigation system.

16. The system of claim 15, wherein the recording prompt is configured by the control circuitry to mimic a voice of the navigation system.

17. The system of claim 11, further comprising, the control circuitry configured to:
configure the recording prompt to inform the user that the user will be delayed in reaching the location where the media consumption device is located in time to consume the content item at its regularly broadcasted time.

18. The system of claim 11, wherein the audio input is associated with the user being involved in a conversation.

19. The system of claim 11, further comprising, the control circuitry configured to:
determine, based on the user's current location, the user will not reach the location where the media consumption device is located in time to consume a second content item at its regularly broadcasted time;
determine whether the user is distracted due to traffic while the user is in their current location; and
in response to determining that the user is distracted due to traffic while the user is in their current location:
delay audible output of a second recording prompt until the user is not distracted due to traffic.

20. The system of claim 19, wherein the determination that the user is distracted due to traffic is based on information obtained by the control circuitry from a navigation application.

* * * * *